March 19, 1935.    J. E. LINDEMAN    1,994,657
HAND BRAKE
Filed May 18, 1931
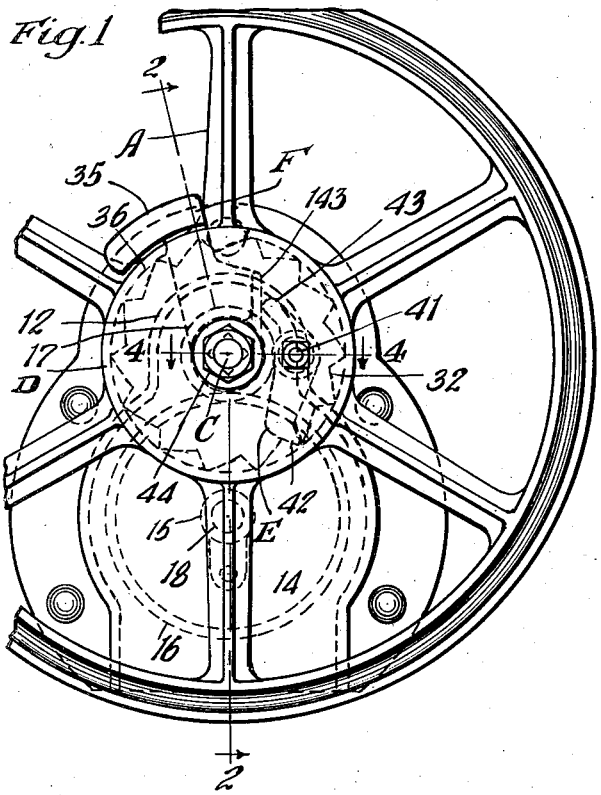
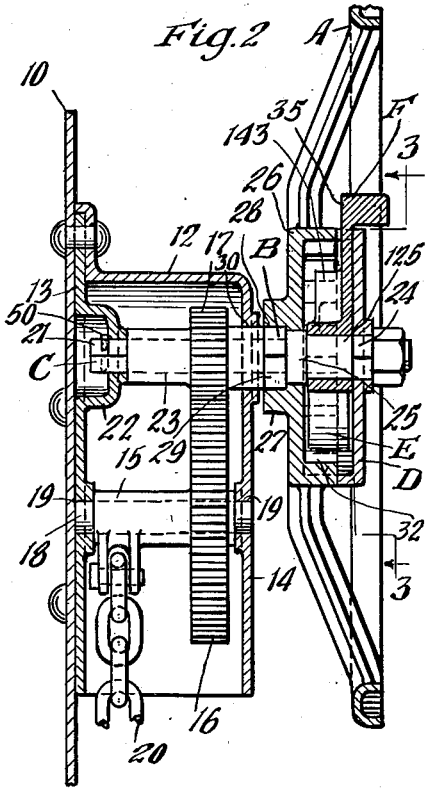
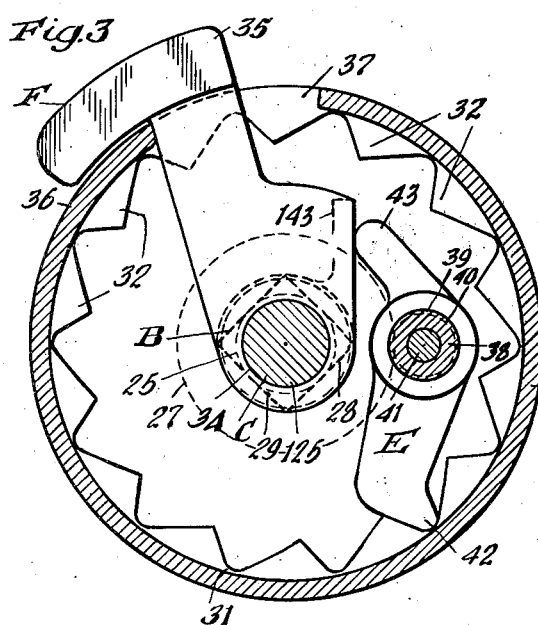
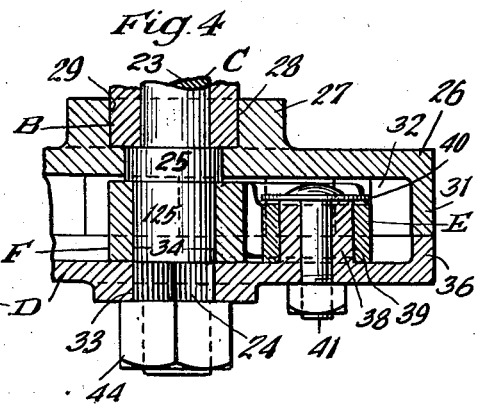
Witness
Wm. Geiger
Inventor
James E. Lindeman
By Henry Fuchs, Atty.

Patented Mar. 19, 1935

1,994,657

UNITED STATES PATENT OFFICE 1,994,657

HAND BRAKE

James E. Lindeman, Chicago, Ill., assignor to W. H. Miner, Inc., Chicago, Ill., a corporation of Delaware Application May 18, 1931, Serial No. 538,141

6 Claims. (Cl. 188—81.1)

This invention relates to improvements in hand brakes.

One object of the invention is to provide in a hand brake for railway cars having rotary tightening means actuated by a hand wheel and cooperating locking means for preventing backward rotation of the winding element, simple and efficient, manually-controlled means for actuating the locking means, which is readily accessible to the operator, being located at the side of the hand wheel at which the operator stands while manipulating the brakes, thereby protecting the operator from injury which might otherwise occur through accidental contact with the revolving hand wheel while reaching past the same in manipulating the usual means for releasing the locking member.

A more specific object of the invention is to provide in a hand brake mechanism including a rotary chain-winding element, means for rotating said element including a hand wheel, ratchet means comprising a locking dog for preventing backward rotation of the winding element and wheel, and means arranged outwardly of the hand wheel for actuating the locking dog to release the same.

Other objects of the invention will more clearly appear from the description and claims hereinafter following.

In the drawing, forming a part of this specification, Figure 1 is a front elevational view of a brake mechanism involving my improvements, showing the mechanism as mounted on the end wall of a railway car. Figure 2 is a vertical sectional view lengthwise of the car, corresponding substantially to the line 2—2 of Figure 1. Figure 3 is an enlarged vertical sectional view, corresponding substantially to the line 3—3 of Figure 2, the outer part of the hand wheel of the brake mechanism being omitted for the sake of clearness. And Figure 4 is a horizontal sectional view on an enlarged scale, corresponding substantially to the line 4—4 of Figure 1, said view being partly broken away.

In said drawing, 10 indicates the vertical end wall of a closed type of railway car, on which my improved hand brake mechanism is mounted. The improved hand brake mechanism is preferably supported within a housing, which is indicated by 12. The housing 12 is of the sectional type, comprising a plate-like member 13 and a cooperating cover section 14 which are secured to each other.

My improvements are shown in connection with the type of power multiplying brake mechanism which is gear operated. As shown in Figures 1 and 2, the brake mechanism proper comprises a chain-winding drum 15 which has a relatively large gear member 16 fixed thereto and cooperates with a driving pinion 17 actuated by the hand wheel of the brakes. The chain-winding drum 15 is supported by means of a shaft 18 having its opposite ends seated in openings 19—19 provided in the outer wall of the cover member 14 and the plate section 13 respectively of the housing. The chain of the brake mechanism is indicated by 20 and is connected to the winding drum in the usual manner. The housing 12 is open at the bottom, as clearly shown in Figure 2, to accommodate the chain for movement.

My improved hand brake mechanism comprises broadly a hand wheel A; a sleeve B fixed thereto; a supporting shaft C; a supporting plate D fixed to the shaft C; a locking dog E; and an operating lever F for the dog.

The supporting shaft C has a portion of square cross-section 21 at the inner end thereof seated in an inwardly extending boss 22 provided on the rear plate member 13 of the housing 12 and is fixed against outward movement by a pin 50 extending through the section 21. As will be evident, the shaft is thus held against rotation. The main body portion of the shaft C is cylindrical, as indicated at 23, to provide a rotary bearing support for the sleeve B. At the outer end the shaft C is also formed of square cross-section, as indicated at 24, for a purpose hereinafter described. Inwardly of and spaced from the section 24 the shaft is enlarged, as indicated at 25, said enlarged portion being in the form of a cylindrical collar. Between the square section 24 and the collar member 25 the shaft is of cylindrical cross-section, as indicated at 125, this section being of slightly larger diameter than the cylindrical portion 23.

The hand wheel A is provided with an inwardly offset hub portion 26 having a reduced section 27 which is provided with an opening 28 of substantially square cross-section which receives the square outer end portion 29 of the sleeve B. The sleeve B is rotatably supported on the shaft C and has the pinion 17 formed integral therewith. Inwardly of the square portion 28 of the sleeve, the same is formed circular in cross-section so as to have bearing engagement in an opening 30 provided in the outer wall of the cover member 14 of the housing. The hub section of the hand wheel A is provided with an annular flange 31 on the outer side thereof having an annular series of interior ratchet teeth 32—32 for a purpose hereinafter pointed out.

The supporting plate D is fixed to the outer end of the shaft C, said plate having a square opening 33 at the center thereof which fits the square portion 24 of the shaft C. Between the plate D and the hub of the hand wheel A is accommodated the operating lever F. The same is provided with a pivot opening 34 at the inner end thereof through which the cylindrical portion 125 of the shaft C extends. At the outer end the lever is provided with an offset section 35 by which the same may be manipulated. As clearly shown in Figures 2 and 3, the supporting plate D is provided with a partial annular flange 36 which registers with the flange of the hub section of the hand wheel. The flange 36 is cut away at the upper side of the plate, as indicated at 37, to accommodate the lever F for swinging movement. As shown in Figures 2 and 3, the operating extension 35 of the lever F is disposed outwardly of the cover-like supporting plate D.

The locking dog E is pivotally supported on the plate D, the plate having an inwardly projecting trunnion member 38 formed integral therewith on which the locking dog is supported. As shown, the locking dog is provided with a pivot opening 39 which receives the trunnion 38 and the dog is held thereon by means of a retaining disc 40 secured to the trunnion 38 by means of a bolt 41 extending through the disc and boss. At one end the dog is provided with a tooth 42 which cooperates with the ratchet teeth 32—32 of the hand wheel A. At the opposite end the dog has a laterally projecting tail 43 which cooperates with a flange 143 on the lever F. The dog is gravity-actuated and is normally in engagement with the teeth 32—32. In order to disengage the dog from the teeth, the lever F is swung to the right, as viewed in Figure 3, thereby rocking the dog on its pivot and disengaging the tooth 42 from the ratchet means.

A securing nut 44 is employed at the extremity of the shaft C to hold the supporting plate D in position and also maintain the operating lever F, the hand wheel A, and the sleeve B in aligned position. The two parts of the housing may be fixed to each other in any suitable manner and, as clearly shown in Figures 1 and 2, are riveted together, the same being provided with flanges through which the rivets extend. The rivets employed to secure the sections of the housing together may also serve to secure the complete housing to the end wall 10 of the car, as shown in Figure 2.

The operation of my improved hand brake mechanism in tightening the brakes is as follows: The hand wheel A is rotated in a clockwise direction, as viewed in Figure 1, thereby rotating the sleeve B therewith and actuating the gear 16 by means of the pinion 17. The rotation thus imparted to the gear 16 causes rotation of the chain-winding drum 15 in chain-winding direction. Backward movement of the chain-winding drum during tightening of the brakes is prevented by means of the locking dog E which engages the ratchet teeth 32—32 of the hand wheel, thereby holding the latter and the parts connected thereto against rotation in chain-unwinding direction. As hereinbefore pointed out, the dog is gravity-actuated and is maintained in operative engagement with the ratchet of the hand wheel unless thrown out of such engagement by means of the lever F. In releasing the brakes the lever F is swung to the right, as viewed in Figure 3, thereby rocking the dog through engagement of the tail 43 thereof. The toothed end 42 of the dog is thus disengaged from the ratchet of the hand wheel, thereby permitting the hand wheel to rotate freely. Inasmuch as the hand wheel is always operatively connected to the chain-winding drum by means of the gear 16 and the pinion 17, the drum will be free to rotate when the hand wheel is unlocked.

From the preceding description taken in connection with the drawing, it will be evident that I have provided an exceedingly simple and efficient mechanism for releasing the holding means of a brake which entirely eliminates the danger of the operator being injured by coming in contact with the revolving hand wheel in manipulating the releasing mechanism. It is further pointed out that by providing the actuating means for manipulating the locking member at the outer side of the hand wheel supported on a fixed member, there is no danger of the same moving with the hand wheel and causing injury to the brakeman; further, the location thereof outwardly of the hand wheel makes it accessible at all times.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a winding element; of a rotary hand wheel for actuating said winding element; said hand wheel being operatively connected to said winding element; a ratchet member rotatable with said hand wheel; a locking dog cooperating with said ratchet member, said dog being supported for pivotal movement on a fixed member extending through said hand wheel and on which the hand wheel is journaled; and means movably mounted on said fixed member at the outer side of said hand wheel, accessible to the brakeman for actuating the dog.

2. In a hand brake mechanism, the combination with a rotary element for tightening the brakes, said element being supported for rotation on a fixed shaft held against rotation; of a hand wheel fixed to said rotary element, said hand wheel having a series of interior, annularly arranged ratchet teeth; a supporting member rigidly fixed to said shaft; a locking dog pivoted on said supporting member and cooperating with said ratchet; and means accessible from the outer side of the hand wheel for actuating said dog to disengage the same from the ratchet to release the brakes.

3. In a hand brake mechanism, the combination with rotary means for actuating the brake, including a hand wheel and a sleeve rigidly fixed to the hand wheel; of a fixed shaft held against rotation, on which said hand wheel and sleeve are rotatable, said shaft extending through the hub portion of the hand wheel; a supporting plate fixed to and rigid with the outer end of said shaft; a locking dog pivoted on said supporting plate; ratchet means on the hand wheel with which said dog cooperates; and means mounted in front of the hand wheel for manipulating the dog.

4. In a hand brake mechanism, the combination with a housing; of a rotary chain-winding element within the housing; a gear fixed to said element; a supporting shaft fixed in said housing against rotation; a sleeve journaled on said shaft; a gear fixed to said sleeve and meshing with said first named gear; a hand wheel exterior to the housing fixed to said sleeve for rotating the same, said supporting shaft projecting through the hand wheel; a supporting plate fixed to the projecting end of said shaft; a dog pivotally supported on said plate; interior ratchet means on the hub of the hand wheel engageable by said dog to lock the hand wheel against rotation in brake releasing direction; and means accessible from the outer side of the hand wheel for manipulating said dog to release the same.

5. In a hand brake, the combination with a rotary chain-tightening means; of a rotary hand wheel having a hub operatively connected to said means for actuating the same; ratchet teeth on the hub of said hand wheel; releasable means engageable with said teeth for preventing backward rotation of the chain-tightening means; and means disposed within the circumference of the hand wheel at the outer side of said hub and with respect to which the hand wheel is rotatable, for actuating said releasable means to disengage the same from the teeth of the hand wheel.

6. In a hand brake mechanism, the combination with a rotary chain-winding mechanism; of a hand wheel for actuating the same; a fixed support extending through the hand wheel, on which said hand wheel is rotatable; releasable means mounted on said support for preventing backward rotation of said chain-winding mechanism; and actuating means movably carried by said support at the front side of the hand wheel for operating said releasable means to disengage the same.

JAMES E. LINDEMAN.